United States Patent [19]

Kawabe et al.

[11] 3,884,683

[45] May 20, 1975

[54] NOVEL SUPERCONDUCTING MATERIAL

[75] Inventors: Ushio Kawabe, Hamura; Shigeo Fukase; Masato Ishibashi, both of Hachioji; Mitsuhiro Kudo, Hamura; Kazue Takatoku, Kokubunji, all of Japan

[73] Assignee: Hitachi, Ltd., Japan

[22] Filed: Jan. 24, 1972

[21] Appl. No.: 220,211

[30] Foreign Application Priority Data

Jan. 22, 1971 Japan .................................. 46-1584

[52] U.S. Cl. .................... 75/174; 148/32; 148/32.5; 148/133; 335/216

[51] Int. Cl. ........ C22c 27/00; C22f 1/18; H01f 1/04

[58] Field of Search ....... 148/32, 133, 32.5; 75/134, 75/174; 335/216

[56] References Cited

UNITED STATES PATENTS 3,275,480 9/1966 Betterton et al. ....................... 148/2

3,310,395 3/1967 Swartz et al. ................... 148/133 X

OTHER PUBLICATIONS

Journal of Applied Physics, Vol. 37, No. 6, May 1966, pgs. 2218–2223.

Z. Naturforsch, 26a, March 26, 1971, pgs. 1035–1039.

*Primary Examiner*—C. Lovell

*Attorney, Agent, or Firm*—Craig & Antonelli

[57] ABSTRACT

A superconducting material consisting essentially of the intermetallic compound represented by a general formula: $(Nb_{1-x}Ta_x)_k\ Al_{1-y}M_y$, wherein M is selected from the group consisting of Be, B, Si, and C, and the values of $x$, $y$, and $k$ are $0 \leqq x \leqq 0.1$, $0.01 \leqq y \leqq 0.2$, and $2.3 \leqq k \leqq 4.0$, respectively. This material has a higher critical temperature than that of the previously known $Nv_3Al$.

14 Claims, 10 Drawing Figures

UNIT CELL OF β-W TYPE CRYSTAL STRUCTURE

NOVEL SUPERCONDUCTING MATERIAL

BACKGROUND OF THE INVENTION

1. Field of the Invention

The present invention relates to a superconducting material having a novel chemical composition, and more particularly to a superconducting intermetallic compound having a $\beta$-W type crystal structure and the high critical temperature.

2. Description of the Prior Art

Superconducting materials have such interesting properties as perfect conductivity, diamagnetism, transition phenomenon, etc.

Various appliances utilizing these properties, such as superconducting magnets, magnetic shields, cryotrons, and the like have hitherto been developed.

Generally, in order to reveal the superconductivity, it is necessary to cool the superconducting material at a lower temperature than its critical temperature.

The critical temperature (Tc) of $Nb_3Sn$, which has been considered to be the superconducting material having the highest critical temperature, is 18°K.

Consequently, a cryogenic technique which utilizes expensive liquid helium as a coolant is necessary in order to cool these superconducting material below its critical temperature.

Under these circumstances the discovery of a superconducting material having even a little higher critical temperature than that of the known superconducting material has been greatly desired.

According to *B.C.S.* theory [J. Bardeen, et al: Phys. Rev. 108, 1175 (1957)] relating to superconductivity, the critical temperature Tc of a superconducting material is represented by the following formula;

$$Tc \cong \langle\omega_o\rangle \exp\left(-\frac{1}{g}\right)$$

where $\langle\omega_o\rangle$ is the average frequency of the phonons that scatter electrons at the Fermi surface and $g$ is the products of the net attractive interaction between the electrons energy (V) by the density of states of d-electrons $[N_{(o)}]$ at the Fermi surface.

Then, in the B.C.S. theory the value of said $\langle\omega_o\rangle$ is represented as an approximation with a value which is proportional to an order of the Debye temperature of the superconducting material, the value of said V is a constant, and said $[N_{(o)}]$ represented as an approximation with a value which is proportional to the electronic specific heat coefficient ($\gamma$) of the superconducting material.

Therefore, in order to obtain a superconducting material having a high critical temperature, it is necessary to find a material with high Debye temperature and high electronic specific heat coefficient.

Table 1 shows the critical temperature and crystal structure of some well known superconducting materials that have the considerably high critical temperature.

TABLE 1

BINARY COMPOSITION

| COMPOSITION | CRITICAL TEMPERATURE (Tc = °K) | CRYSTAL STRUCTURE |
|---|---|---|
| $Nb_3Sn$ | 17.8 – 18.3 | $\beta$-W |
| $Nb_3Al$ | 17.5 – 18.4 | do. |
| $V_3Si$ | 16.4 – 17.1 | do. |
| $V_3Ge$ | – 17.0 | do. |
| $V_3Ga$ | 14.2 – 16.8 | do. |
| NbN | 11.0 – 16.0 | NaCl |
| TcMo | 11.0 – 15.8 | do. |
| $Nb_3Ga$ | 14.2 | $\beta$-W |
| MoC | 9.0 – 13.5 | NaCl |
| TaC | 9.0 – 11.4 | do. |

TERNARY COMPOSITION

| COMPOSITION | CRITICAL TEMPERATURE (Tc = °K) | CRYSTAL STRUCTURE (type) |
|---|---|---|
| $Nb_3Al_{0.8}Ge_{0.2}$ | 20.05 – 20.5 | $\beta$-W |
| $Nb_3Al_{0.7}Ga_{0.3}$ | 18.6 | do. |
| $Nb_3Sn_{0.92}Al_{0.08}$ | 18.56 | do. |
| $Nb_3Sn_{0.95}Al_{0.05}$ | 18.36 | do. |
| $Nb_3Sn_{0.9}In_{0.1}$ | 18.0 – 18.28 | do. |
| $Nb_3Sn_{0.9}Bi_{0.1}$ | 18.26 | do. |
| $Nb_3Sn_{0.9}Tl_{0.1}$ | 18.26 | do. |
| $Nb_3Sn_{0.9}Pb_{0.1}$ | 18.24 | do. |
| $Nb_3Sn_{0.95}Ge_{0.05}$ | 18.1 | do. |
| $Nb \cdot N_{0.5}C_{0.5}$ | 17.8 | NaCl |

Some of the superconducting materials having the relatively high critical temperature are found in a group of intermetallic compounds, which have the $\beta$-W type crystal structure, the relatively high electronic specific heat coefficient ($\gamma$), and the high Debye temperature ($\theta_D$), i.e., $Nb_3Sn$, $Nb_3Al$, $Nb_3Al_{1-y}Ge_y$, and the like.

However, such superconducting materials having the $\beta$-W type crystal structure as mentioned above cannot be obtained until they are subjected to difficult ageing such as 700°C × 1,000 hours. Thus the manufacture of these materials is not easy.

On the basis of the McMillan's theory presented recently in Phys. Rev. 167 ('68) 331, by W. L. McMillan, the critical temperature of a superconducting material is given by the following formula;

$$Tc = \frac{<\omega_o>}{1.45} \exp \left[ - \frac{1.04(1+\lambda)}{\lambda - \mu^*(1+0.62\lambda)} \right],$$

where $<\omega_o>$ is the average frequency of the phonons, $\mu^*$ and $\lambda$ are the electron-electron and electron-phonon coupling constants, respectively. In this McMillan's theory, it is concluded that the maximum value of critical temperature of superconducting materials is within a range of 25° to 40°K.

SUMMARY OF THE INVENTION

An object of the present invention is to provide a superconducting material having a novel composition which can be made into a stable β-W type crystal structure having a high critical temperature even by a relatively short period of treatment in contrast to the previous superconducting materials having relatively high critical temperatures.

Another object of the present invention is to provide a superconducting materials having a high critical temperatures and relatively high critical current densities (Jc).

Another object of the present invention is to provide a superconducting material to be used under simpler cryogenic conditions than previously.

The superconducting material due to the present invention is obtained from an improvement of $Nb_3Al$ which is previously well known for one of the superconducting materials having a high critical temperature in a group of the superconducting binary intermetallic compound with the β-W type crystal structure.

The superconducting materials of the present invention are characterized in that a suitable amount of Al of the $Nb_3Al$ is substituted by a tertiary element M, which has a smaller atomic radius of the coordination number 12 than that of Al, and which simultaneously has a higher Debye temperature than that of Al, respectively.

According to the present invention, the above-mentioned tertiary element is an element selected from the group consisting of berillium (Be), boron (B), silicon(Si), and carbon (C).

Occasionally, according to the present invention a suitable amount of Nb of the material $Nb_3Al$ is further substituted by tantalum (TA).

Therefore, the chemical composition of the superconducting material of the present invention is represented by the following general formula;

$$(Nb_{1-x}Ta_x)_k Al_{1-y} M_y,$$

where the values of $x$, $y$, and $k$ are selected within such ranges that it is easy to crystallize the composition in a desired β-W type crystal structure and hence heat treatment is also easy.

<Accordingly, the suitable ranges of said values of $x$, $y$, and $k$ are given as follows:

$0 \leq x \leq 0.05$,
$0.01 \leq y \leq 0.2$,
and $2.3 \leq k \leq 4.0$

BRIEF DESCRIPTION OF THE DRAWINGS

The superconducting material of this invention will be further understood by reference to the following detailed description and the accompanying drawings wherein.

DESCRIPTION OF THE PREFERRED EMBODIMENTS

Figure 1:
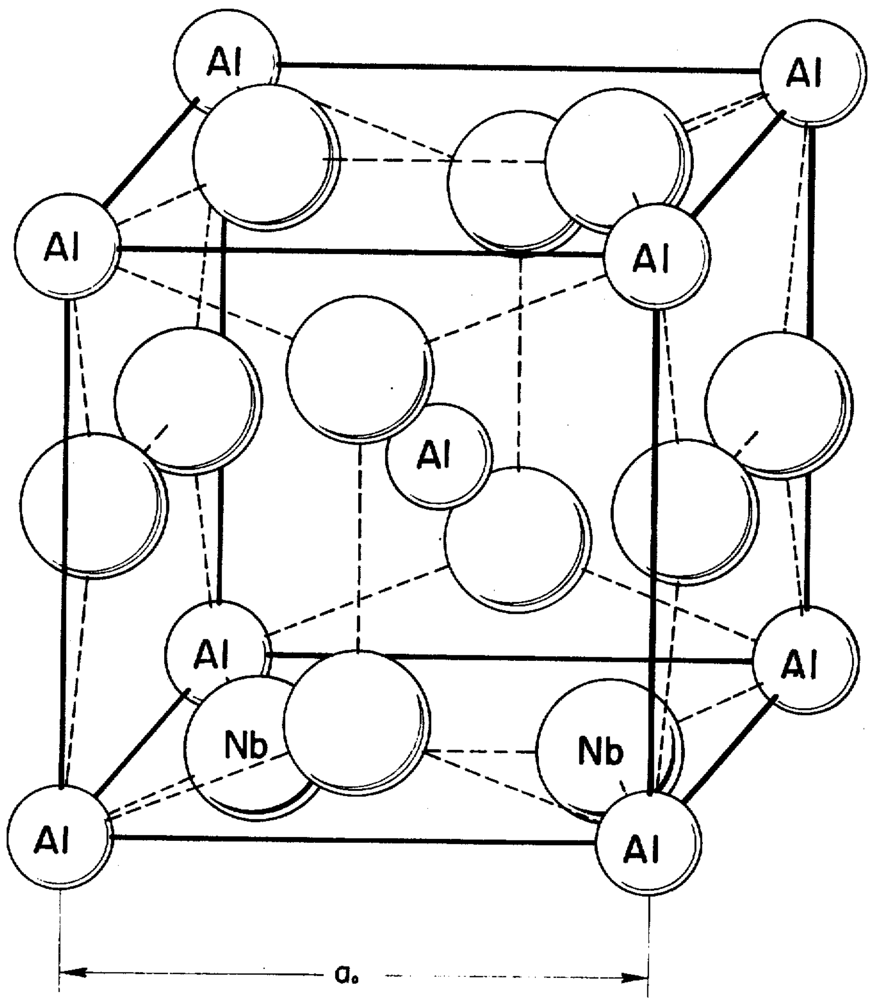
FIG. 1 is a schematic model of the β-W type crystal structure.

A model (unit cell) of the β-W type crystal structure of the intermetallic compound represented by a chemical formula $Nb_3Al$ shown in FIG. 1. It is characteristic of this crystal structure that it is constructed by the complex lattice structure comprising a body centered cubic crystal lattice consisting of Al and the chain like lattice consisting of Nb atoms situated on the three faces of said body centered cubic lattice crossing rectangular each other.

In this superconducting material having the β-W type crystal structure, it is generally known that the critical temperature increases when the composition of the material approaches the stoichiometric composition and that the chains of Nb atoms form extremely narrow d-band structure at the Fermi surface in the β-W type crystal structure.

Since the d-band structure as aforesaid and the density of state of d-electron at the Fermi surface are increased, the critical temperature is thereby increased.

The present invention is based on the discovery by the present inventors that when the Al atoms of the $Nb_3Al$ are substituted by the atoms of aforementioned tertiary element M, the Debye temperature is increased and the lattice constant ($a_o$ as shown in FIG. 1) is decreased, and that the material can be thereby obtained with a higher critical temperature than the base compound $Nb_3Al$.

Furthermore, the present invention is based on the discovery by the present inventors that when a suitable amount of Nb of the above-mentioned superconducting material is substituted by Ta in accordance with the present additional invention, the β-W type crystal structure approaches to the closest packed structure and the material shows a more stable $\beta$-phase.

Preparation of Specimens

As raw materials, all samples of elements Nb, Ta, Al, and tertiary element M each having a purity of 99% up were prepared, and weighed quantities of each for various desired values of $x$, $y$, and $k$ of the chemical formula $(Nb_{1-x}Ta_x)_k(Al_{1-y}M_y)$ were melted under an argon atmosphere in a plasma arc furnace, the melts were inverted for several times to mix them uniformly, and the melts were solidified into button like samples. The materials thus prepared were again melted using a leviation melting furnace, and then cast into water-cooled copper mold to form a rod shape ingot (this is an "as cast" specimen) of about 3 mm in diameter and about 30 mm long. Casting is conducted in argon atmosphere.

The "as cast" specimen was placed in a quartz tube, sealed in a high vacuum and then aged at a temperature of 650° to 1100°C. for 24 to 360 hours. Generally the high vacuum is equal to about $10^{-5}$ mm Hg and preferably from about $10^{-6}$ mm Hg.

The values of $x$, $y$, and $k$ of the resulting intermetallic compounds were quantitatively determined by a chemical analysis, and the crystal structures and lattice constants thereof were examined by an X-ray powder diffraction method.

According to the result of the X-ray analysis, some of the "as cast" specimens showed X-ray diffraction patterns of the $\beta$-W type crystal structure, which patterns were observed to be broad.

As the heat treatment proceeded, the patterns become sharp. Particularly effective heat treatment is done in a temperature range of from about 600° to about 700°C. for a period of time equal to at least about 50 hours and preferably equal to 300 hours and in some cases longer, e.g. 500 hours.

From the result of the above-mentioned investigations, it has been confirmed that $(Nb_{1-x}Ta_x)_kAl_{1-y}M_y$, in which the values of $x$, $y$, and $k$ are selected within ranges of $0 \leq x \leq 0.1$, $0 \leq y \leq 0.2$, and $2.3 \leq k \leq 4.0$, respectively, result in a favorable $\beta$-W type crystal structure by virtue of the above-mentioned heat treatment.

According to the present invention, more particularly, when the values of $x$ and $y$ are within a range of $0 \leq x \leq 0.05$ and $0.01 \leq y \leq 0.2$ and when the value of $k$ is about 3, that is, the chemical composition comprises about 70 – 75 atomic % of Nb, about 0 – 4 atomic % of Ta, about 20 – 24.75 atomic % of Al, and about 0.25 – 5 atomic % of the tertiary element M, the materials have relatively high critical temperatures as compared with the previously known compound $Nb_3Al$.

Superconducting Properties of the Specimens

The critical temperature was measured by a conventional four-probe resistivity technique when a current density of 1 A/cm² passed through a specimen of 30 mm long. The critical temperature was determined to be a temperature at which the resistivity of the specimen became one-half the difference between resistivities of the superconducting and normal states during the transition.

The thermometer used in that measurement of the critical temperature is a germanium thermometer by Honewell Co. in U.S. which calibrated three temperatures of liquid helium, liquid hydrogen, and liquid nitrogen under an atmosphere.

Figure 2:
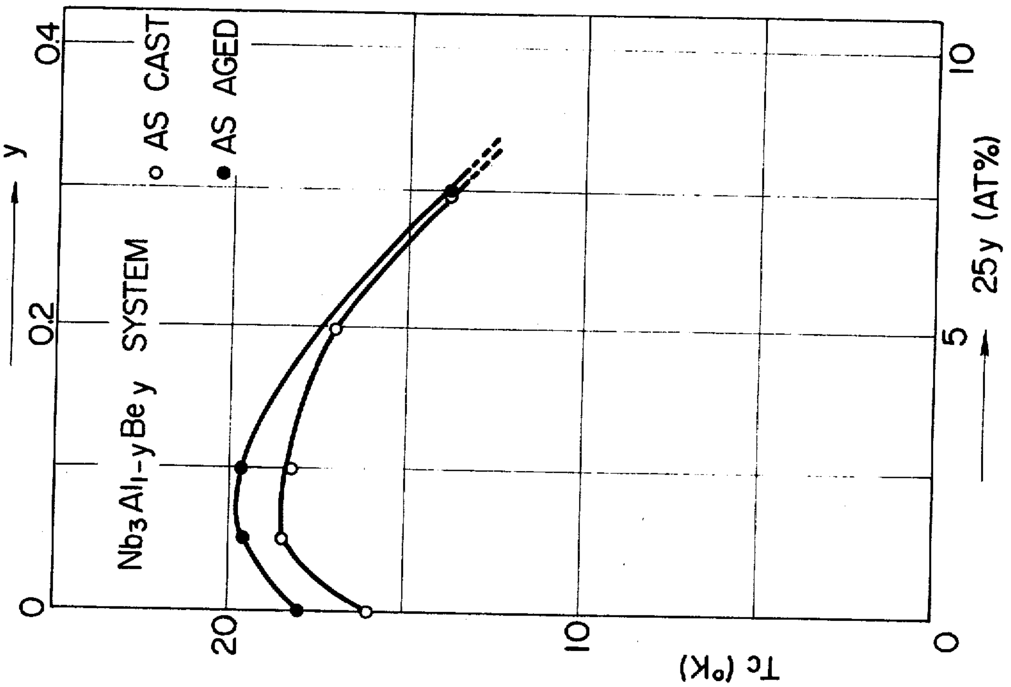
FIG. 2 is a graph showing the relation between the concentration of Be and the critical temperature for the material "as cast" and "as aged" of the superconducting $Nb_3Al_{1-y}Be_y$ series.

FIG. 2 shows the relation between the concentration of Be and the critical temperature for "as cast" and "as aged" of the material $Nb_3Al_{1-y}Be_y$, i.e., the value of $x$ is set at 0 and the value of $k$ is set at 3 subjected to ageing at 700°C for 300 hours.

These relations for the "as cast" and "as aged" are substantially similar to each other, the critical temperature of the "as aged" being higher than that of the "as cast" specimens by about 2°C.

As seen from FIG. 2, when the concentration of Be is within a range of less than about 5 atomic %, i.e., the value of $y$ is within a range less than 0.2, the critical temperature of the present specimens is higher than that of the base compound $Nb_3Al$, i.e., when $y = 0$.

A peak of the critical temperatures occurs between the range of about 1.2 to 3 atomic % of the Be concentration.

Figure 3:
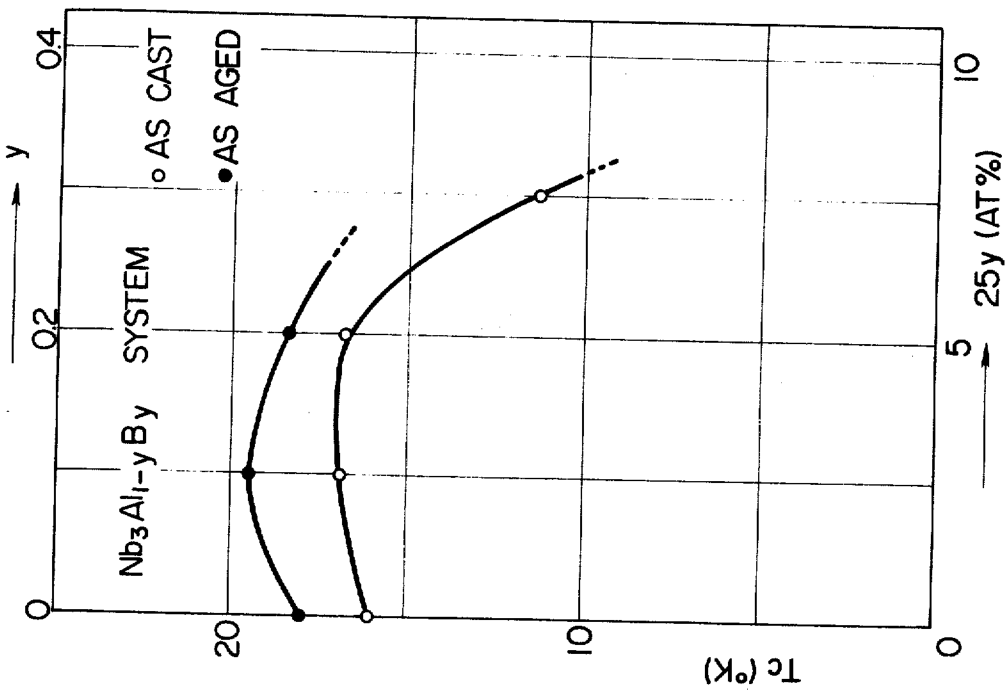
FIGS. 3, 4 and 5 are graphs showing the relation between the concentration of B, Si, and C and critical temperatures for "as cast" and "as aged" of superconducting $Nb_3Al_{1-y}B_y$, $Nb_3Al_{1-y}Si_y$, and $Nb_3Al_{1-y}C_y$, respectively.
Figure 4:
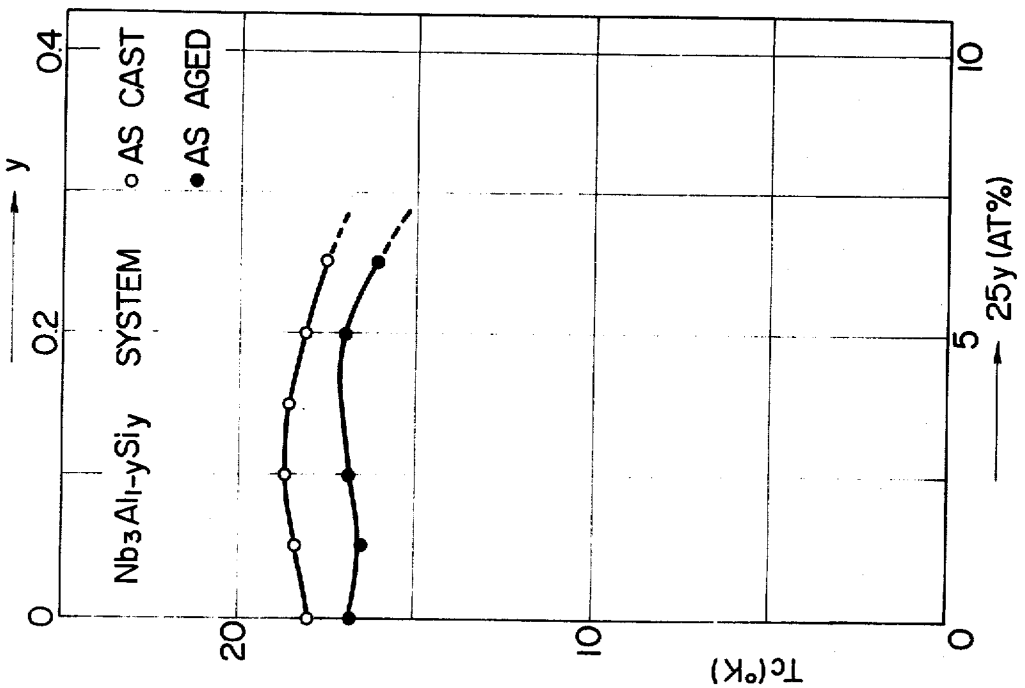

FIGS. 3 and 4 show the relationship between the concentration of B and Si of $Nb_3Al_{1-y}B_y$ and $Nb_3Al_{1-y}Si_y$ and the critical temperatures of "as cast" and "as aged" specimens subjected to ageing at 700°C for 300 hours, respectively.

Figure 5:
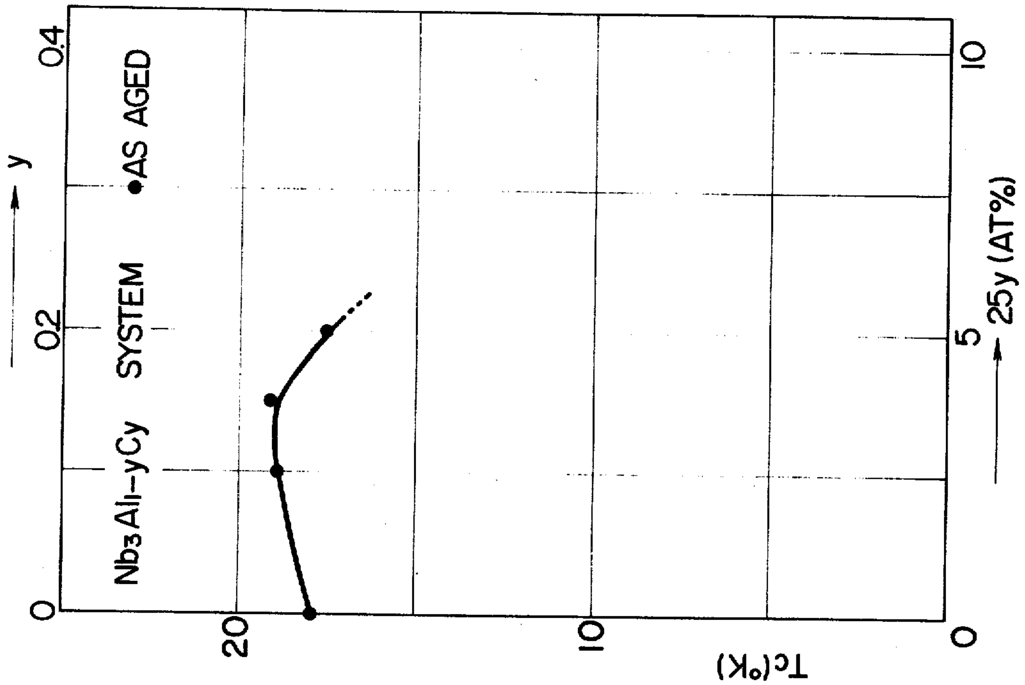

An FIG. 5 shows the relationship between the concentration of carbon of $Nb_3Al_{1-y}C_y$ and the critical temperatures of "as aged" specimen provided under the same condition noted above.

As seen from these Figures, the relation between the critical temperature and composition of these specimens is similar to the result of the previously mentioned $Nb_3Al_{1-y}Be_y$.

And then, the peak values of critical temperature of the present examples were 19.5°K (M = Boron; $y$ = 0.1), 18.6°K (M = Silicon; $y$ = 0.15) and 19.0°K (M = Carbon; $y$ = 0.15).

Figure 6:
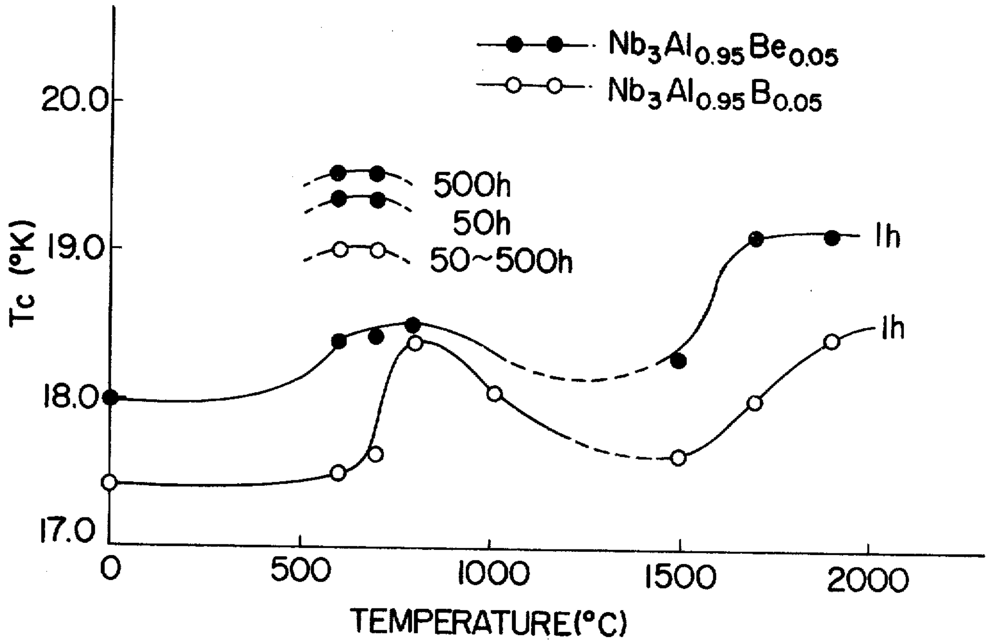
FIG. 6 is a graph showing the relation between the critical temperature and the ageing temperature of $Nb_3Al_{0.95}Be_{0.05}$ and $Nb_3Al_{0.95}B_{0.05}$.

FIG. 6 shows the relationship between the critical temperatures and the ageing temperatures for 1 hour provided for $Nb_3Al_{0.95}Be_{0.05}$ and $Nb_3Al_{0.95}B_{0.05}$ of "as aged" specimens, and for a reference this figure also shows the ageing relation for 50 and 500 hours at a temperature range of only 600° to 800°C.

In the present investigations, a peak and a valley of the critical temperatures were observed at an ageing temperature range of 600° to 800°C and at a range of 1,000° to 1,500°C, respectively.

Figure 7:
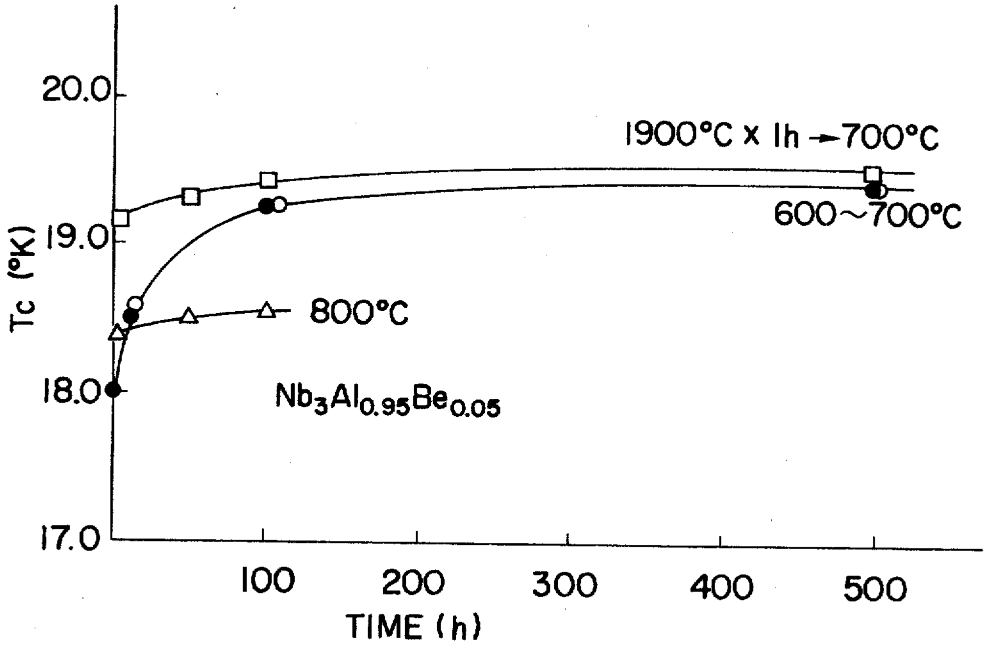
FIG. 7 is a graph showing the relation between the critical temperature and the ageing time of $Nb_3Al_{0.95}Be_{0.05}$ and $Nb_3Al_{0.95}B_{0.5}$.

FIG. 7 shows the relation between the critical temperature of "as aged" specimens and the ageing time of $Nb_3Al_{0.95}Be_{0.05}$ and $Nb_3Al_{10.95}B_{0.05}$ at the temperature of 700° and 800°C.

As seen in FIG. 7, the critical temperature increases with increasing of the ageing time and a leveling off after more than about 100 hours are observed.

It is therefore clear according to the present superconducting material that the ageing time necessary for obtaining high critical temperature is very short as compared with that of the previous materials such as aforesaid $Nb_3Al_{0.8}Ge_{0.2}$ and the like.

According to the present invention, the lattice constant of the $\beta$-W type crystal structure of $Nb_3Al_{1-y}M_y$ is decreased upon an increase in the tertiary element M and the $\beta$-W type crystal structure is caused to be more stable by substitution of Nb with Ta which has smaller atomic radius than that of Nb and the interatomic distance of the chain lattice consisting of Nb atoms is thereby decreased matching to a decrease of said lattice constant $a_\circ$.

Generally, the amount of Ta substituted for Nb is not more than about 5 atomic %.

Figure 9:
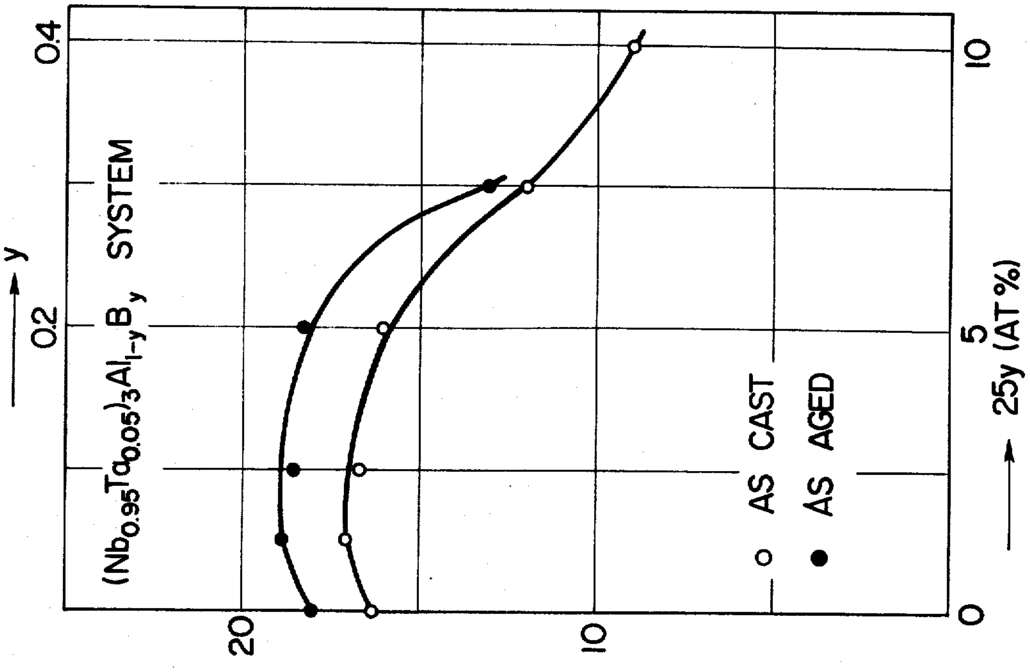
FIGS. 8 and 9 are graphs showing the relation between the concentration of Be and B and the critical temperatures for "as cast" and "as aged" superconducting $(Nb_{0.95}Ta_{0.05})_3Al_{1-y}Be_y$, and $(Nb_{0.95}Ta_{0.05})_3Al_{1-y}B_y$ series, respectively.
Figure 8:
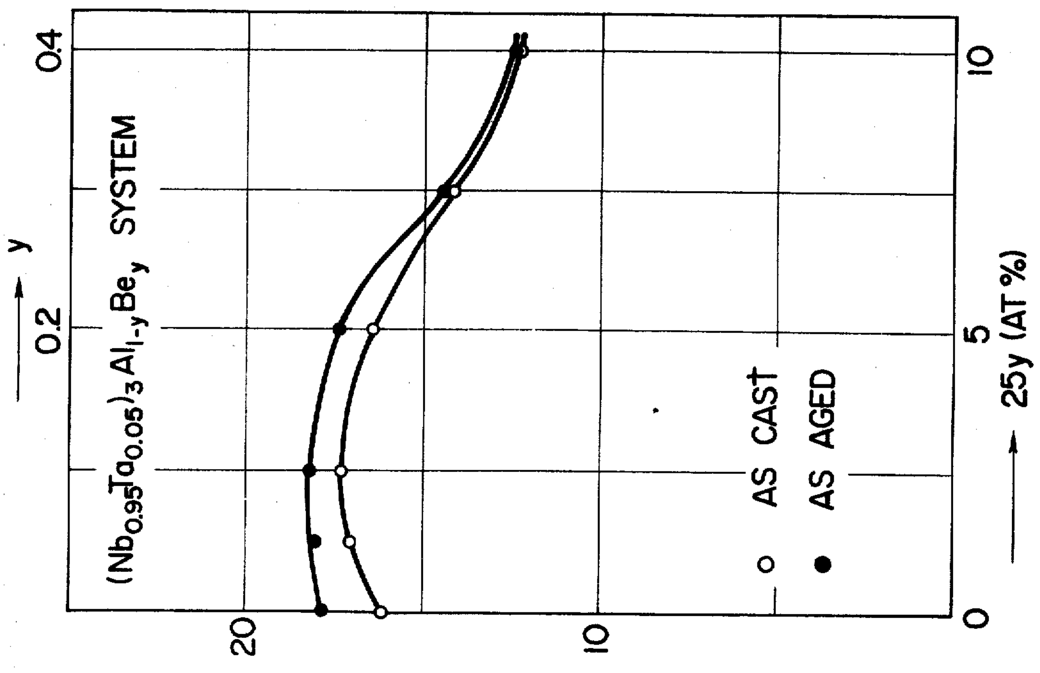

FIGS. 8 and 9 show the relationship between the values of $y$ and the critical temperature of $(Nb_{0.95}Ta_{0.05})_3Al_{1-y}Be_y$ and $(Nb_{0.95}Ta_{0.05})_3\ Al_{1-y}B_y$ of "as cast" and "as aged" specimens subjected to the ageing of same condition as aforementioned specimens, i.e., 700°C for 300 hours.

Moreover, some of the superconducting material of the present invention has considerably higher critical current density (Jc) as compared with the previous superconducting materials.

Figure 10:
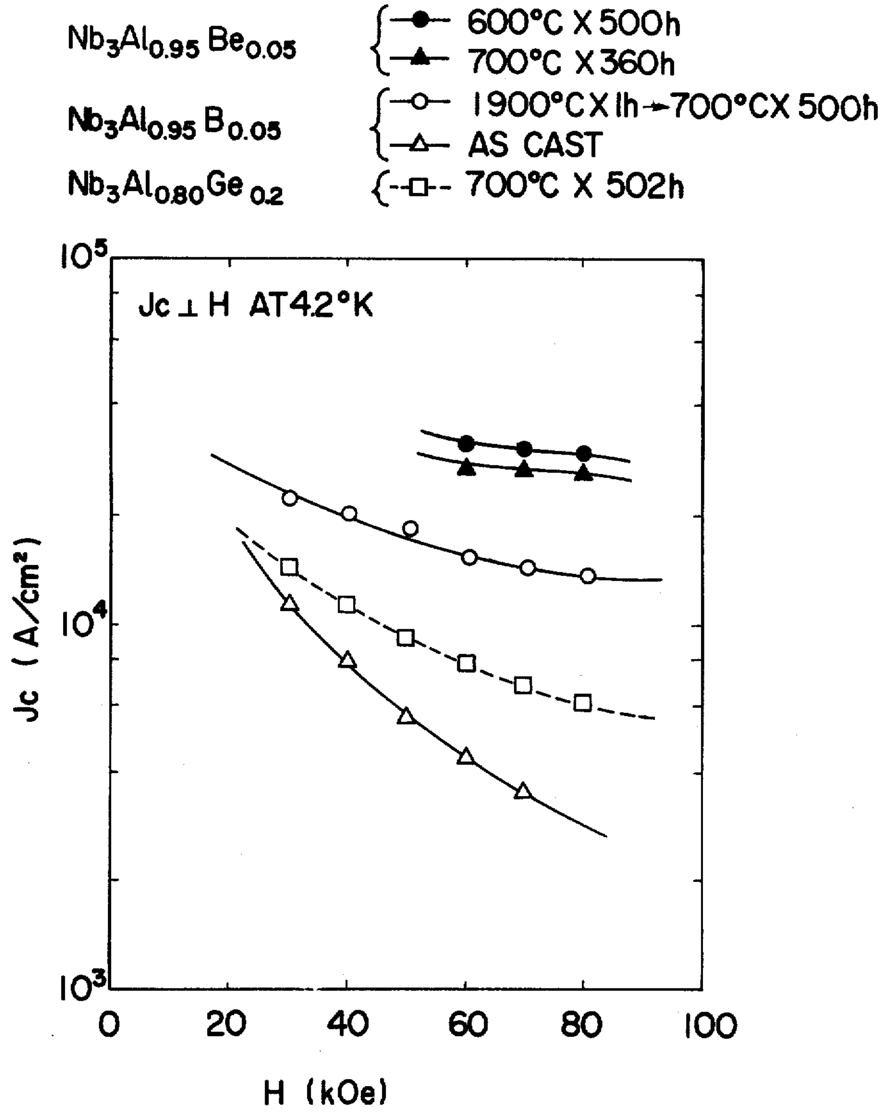
FIG. 10 is a graph showing the H-Jc curve of $Nb_3Al_{0.95}Be_{0.05}$, $Nb_3Al_{0.95}B_{0.05}$ and previously known $Nb_3Al_{0.8}Ge_{0.2}$.

FIG. 10 shows the critical current density (Jc) versus transverse magnetic field (H) properties of the present $Nb_3Al_{0.95}Be_{0.05}$, $Nb_3Al_{0.95}B_{0.05}$, and the previous $Nb_3Al_{10.8}Ge_{0.2}$ which have a high critical temperature. The critical current density (Jc) is determined to be a current divided by the cross-sectional area of the specimen when a voltage of 100 $\mu$V can be detected across both ends of the specimen by an electric current being passed at 4.2°K in the applied transverse magnetic field.

As seen in FIG. 10, the superconducting $Nb_3Al_{0.95}Be_{0.05}$ and $Nb_3Al_{0.95}B_{0.05}$ subjected to the heat treatment have the current carrying capacity of $8 \times 10^3$— $2 \times 10^4$ A/cm² at 4.2°K even in a transverse magnetic field of 60 KOe. This values of the critical current density are fairly high as compared with conventional material, for example, $Nb_3Al_{0.8}Ge_{0.2}$ which is known as the material having the highest critical temperature previously.

What is claimed is:

. 1. A superconducting material consisting essentially of an intermetallic compound having a $\beta$-W type crystal structure represented by the formula:

$$(Nb_{1-x}Ta_x)_kAl_{1-y}M_y\ ,$$

wherein M is an element selected from the group consisting of Be, and Si and the values of $x$, $y$, and $k$ are $0 \leqq x \leqq 0.1$, $0.01 \leqq y \leqq 0.2$, and $2.3 \leqq k \leqq 4.0$, respectively.

2. The superconducting material of claim 1, wherein the composition of the material consists essentially of about 74 to about 84 atomic % of Nb, about 15 to about 29 atomic % of Al, and about 1 to about 15 atomic % of an element selected from the group consisting of Be, and Si.

3. The superconducting material of claim 1, wherein the composition of the material consists essentially of about 70 to about 75 atomic % of Nb, about 0 to about 4 atomic % of Ta, about 20 to about 24.75 atomic % of Al, and aout 0.25 to about 5 atomic % of the element represented by M.

4. The superconducting material of claim 1, wherein $k$ equals 3 and $x$ equals 0.

5. A superconducting material consisting essentially of an intermetallic compound having a $\beta$-W-type crystal structure represented by the formula:

$$(Nb_{1-x}Ta_x)_k\ Al_{1-y}M_y$$

where M is an element selected from the group consisting of Be, and Si, the values of $x$, $y$, and $k$ are $O \leqq x \leqq 0.1$, $0.01 \leqq y \leqq 0.2$, and $2.3 \leqq k \leqq 4.0$, respectively, and said material has been heat treated for a period of at least about 50 hours at a temperature of at least about 600°C.

6. The superconducting material of claim 1, wherein said material has been aged so as to have a high critical temperature.

7. The superconducting material of claim 1, wherein said material has a critical temperature greater than at least about 17.0°K.

8. The superconducting material of claim 1, wherein said material exhibits a critical current density of at least greater than $8 \times 10^3$ A/cm² for transverse magnetic fields of 30–80 KOe at 4.2°K.

9. The superconducting material of claim 1, wherein the value of $y$ is $0.05 \leqq y \leqq 0.2$.

10. A superconducting material consisting essentially of an intermetallic compound having $\beta$-W type crystal structure represented by the formula:

$$(Nb_{1-x}Ta_x)_kAl_{1-y}M_y,$$

wherein M is Be in the amount of about 1.2 atomic %, and the values of $x$, $y$, and $k$ are $0 \leqq x \leqq 0.1$, $0.01 \leqq y \leqq 0.2$, and $2.3 \leqq k \leqq 4.0$, respectively.

11. The superconducting material of claim 1, wherein M is Si and $y$ is 0.15.

12. A superconducting material consisting essentially of an intermetallic compound having a $\beta$-W type crystal structure, wherein said intermetallic compound is $Nb_3Al_{0.95}Be_{0.05}$.

13. The superconducting material of claim 5, wherein the value of $y$ is $0.05 \leqq y \leqq 0.2$.

14. The superconducting material of claim 3, wherein said composition includes the element represented by M in an amount of about 1 to about 5 atomic %.

* * * * *